United States Patent

[11] 3,585,378

[72] Inventors Willard G. Bouricius
Katonah;
Keith A. Duke, Wappingers Falls, both of, N.Y.

[21] Appl. No. 837,753
[22] Filed June 30, 1969
[45] Patented May 15, 1971
[73] Assignee International Business Machines Corporation
Armonk, N.Y.

[54] ERROR DETECTION SCHEME FOR MEMORIES
11 Claims, 4 Drawing Figs.

[52] U.S. Cl. ........ 235/153, 340/174
[51] Int. Cl. ........ G11c 29/00, H03k 13/34
[50] Field of Search ........ 340/146.1, 174 ED, 174.1; 235/153

[56] References Cited

UNITED STATES PATENTS

| | | | |
|---|---|---|---|
| 3,049,692 | 8/1962 | Hunt | 340/146.1 |
| 3,079,597 | 2/1963 | Wild | 340/146.1 X |
| 3,221,310 | 11/1965 | Reach | 340/146.1 X |
| 3,270,318 | 8/1966 | Strawbridge | 340/146.1 |

*Primary Examiner*—Malcolm A. Morrison
*Assistant Examiner*—Charles E. Atkinson
*Attorneys*—Hanifin and Jancin and Roy R. Schlemmer, Jr.

ABSTRACT: A method and apparatus for detecting errors occurring as a result of faulty memory operation. By storing every data word in an addressable memory at an address therein having a parity with a fixed predetermined relationship to the parity of the said data word, errors occurring in the memory may be detected. By incorporating an extra bit in the memory word, the error can be isolated and by incorporating two extra bits, double word readout errors may be detected.

INVENTORS
WILLARD G. BOURICIUS
KEITH A. DUKE

BY Roy R. Hoffman, Jr.
ATTORNEY

CONTROL STORAGE WORD

ERROR DETECTION SCHEME FOR MEMORIES

BACKGROUND OF THE INVENTION

Error detection is one of the major problems in the maintenance of present day electronic computers. Generally speaking, the larger the system and the greater speed of operation of said system, the greater the problem is. This is primarily due to the fact that once an error has occurred in large high speed systems the error may adversely affect many subsequent machine operations before it can be detected and/or corrected. Accordingly, in most modern day computers, a very large amount of circuitry, time and money is expended in the design of peripheral circuitry to continually check the operation of the computer at various stages for erroneous operation.

Obviously, an error may occur at any point in a computer; in logical circuitry per se, simple switching gates or even in interconnecting cables wherein as open circuit can cause a continuous bit failure. A particular area in a computer which requires considerable testing is that of the computer memory. Due to the complexity of most computer memories, including the various addressing circuitry, the memory decoders, drivers, sense networks, amplifiers, etc., there are many possible locations in which a failure can occur. Further, a failure in this area is usually propagated to any and all subsequent portions of the computer where the data is used.

More particularly, in many large scale computer systems, a special set of very high speed memory locations are utilized to store repeatedly accessed information whether it be data instructions, or some other type of information. These storage locations or registers are conventionally combined into a memory referred to as a control memory. Such control memories are often Read Only Stores (ROS). The essential characteristics of such a memory is that the location of each data word is essentially arbitrary although the data itself remains unchanged. As will be apparent, any failure in such a memory will, or at least has the capability of adversely affecting a great many subsequent memory operations.

A number of schemes have been used in the past to indicate the existence of faulty binary data in electronic computers. The most commonly used scheme involves the use of one or more parity bits. The simpliest is the single parity bit scheme wherein the parity bit may be set to a one or a zero depending upon the character of the data which it accompanies. In some systems, it might be desired to set all parities equal to an even number of ones. Thus, if the data contained an odd number of ones, a parity bit would be set to a one so that the total number of bits in the transmitted data word would be an even number of ones. The same scheme could equally well be used also to always insure that the total number of ones in a transmitted data word were odd. Alternatively, the parity bit could be set to a one or a zero depending upon whether an odd or even number of ones were present in the main data word. As this applies to memory operation, a parity bit may be included with the address and also with each data word stored in the memory. Thus, the parity of the address may be checked and the parity of the data word may be checked after readout. However, such a system does not normally pick up double word readout errors or address decoder and similar errors wherein the wrong word is read out of the memory.

In one type of prior art error detection system utilized with Read Only Stores (ROS), a separate parity bit is utilized for the data portion of the memory word and the address portion of the memory word. In such a system an addressing failure frequently manifests itself as an address parity failure due to the misinterpretation of a particular address bit and a reading error manifests itself as a data parity failure.

Further, many other much more complex schemes for both detecting and correcting data errors, such as Hamming Codes, etc. are well known in the computer arts. However, these techniques require the use of a great many additional bits in given data or address words and increase the cost of the resultant machine utilizing such a scheme.

It many thus be seen that there is a need in the computer industry and especially with regard to the operation of computer memories to detect and identify errors with the least number of extra memory bits dedicated to such error checking and at the least possible expense for extra circuitry.

SUMMARY AND OBJECTS OF THE INVENTION

It has now been found that the reliability of certain types of computer memories may be significantly improved by utilizing an error detection scheme which checks both the address and the data word on a readout cycle and which will provide an error indication in the event of faulty memory operation. It further achieves there results, according to a number of different embodiments of the invention, utilizing a minimum amount of additional storage locations and extra checking circuitry for utilizing the additional data. The invention has particular application for use with control memories wherein the data content of the memory may be somewhat arbitrarily assigned. For example, in conventional control memories various instruction strings are normally linked together by including the address of the next instruction in the string within the proceeding data word. Thus, the parity of a given address within a data word may be altered by simply changing the address itself which will obviously change the bit configuration for said address. A similar technique may be utilized in more conventional read-write memories; however, a considerable amount of input data processing would be necessary to obtain the proper parity conditions as will be set forth subsequently.

It is accordingly a primary object of the present invention to provide an error checking system for memories.

It is a further object to provide such an error checking system which has primary application to control memories.

It is yet another object to provide such an error checking system wherein an error occurring in either the addressing circuitry or in the memory itself may be identified.

It is a still further object to provide a means of indicating whether the error occurred in the addressing circuitry or in the memory or readout circuitry.

It is yet another object to provide such an error checking system which will also indicate that a double word read out error has occurred.

The foregoing and other objects, features and advantages of the present invention will be apparent from the following more particular description of preferred embodiments of the invention, as illustrated in the accompanying drawings.

DESCRIPTION OF THE DISCLOSED EMBODIMENTS

The objects of the present invention are accomplished in general by a method for achieving error detection in computer memories which comprises the steps of storing all data in said memory at an address in said memory so that the parity of the address and the parity of the data stored in said memory at said address have the fixed predetermined relationship when both the memory addressing circuitry, the memory per se and the memory readout circuitry are operating correctly. After each memory read cycle, the parity of the just accessed address as stored in the memory address register is determined and the parity of the data just read out of said memory and stored in the memory data register is determined. Finally, the two parties are compared for said predetermined relationship to each other, and an error is indicated if this relationship is not present.

According to further aspects of the invention, by setting the parities of the address and the data word associated therewith to be equal and utilizing a single parity bit to indicate the nature of the equal parities, it is possible to specify whether the error occurred in the addressing circuitry or in the memory and readout circuitry.

By still further utilizing the above system and an additional check bit, it is possible to determine if the nature of the failure was a double word read out from memory.

The only additional hardware items necessary to effect the objects of the present invention are essentially an address parity generator, a data parity generator and a comparator for receiving the outputs of the above two generators and means for determining when a comparison (no comparison) is indicative of a memory system error. In the embodiments utilizing one and two extra check bits, two and three comparators respectively would be required to provide the desired error information.

Figure 1:
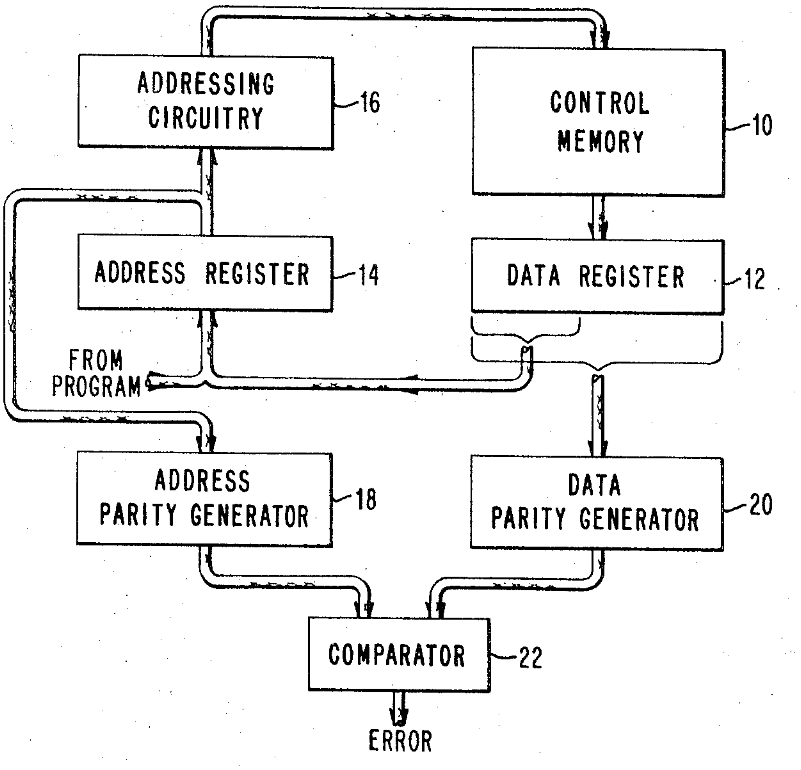
FIG. 1 comprises a functional block diagram of an error checking system according to the invention which will indicate solely that an error has occurred somewhere in the memory system.
Figure 2:
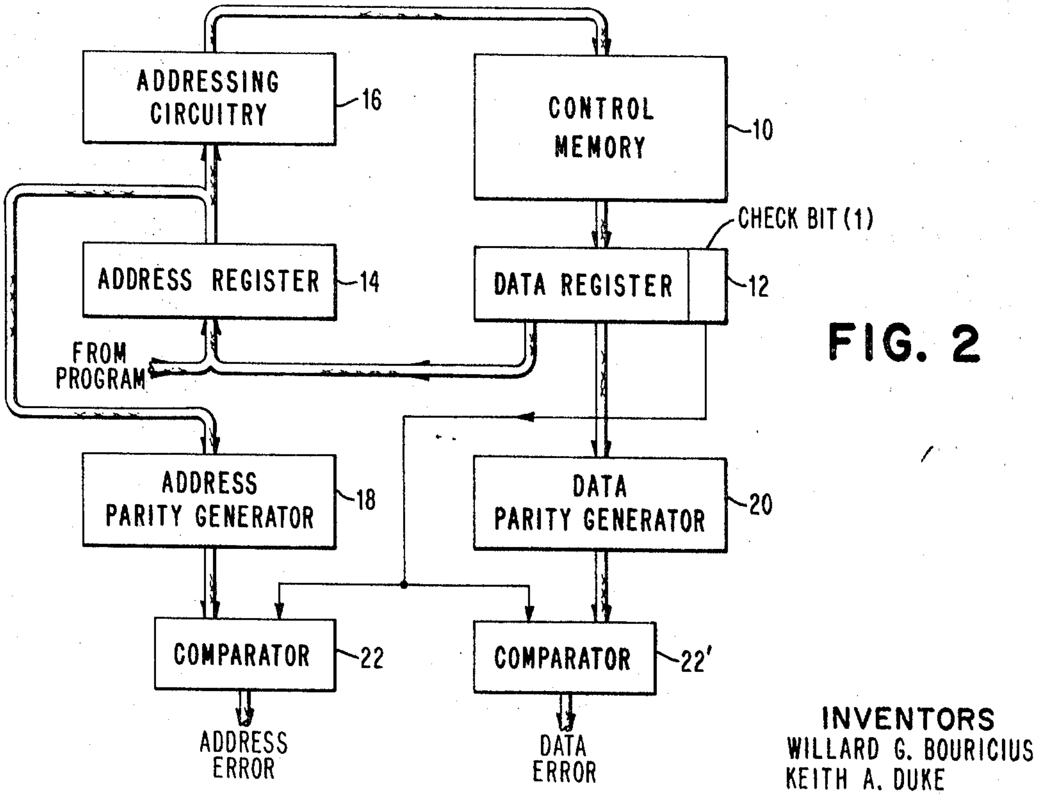
FIG. 2 is a functional block diagram of an error checking system according to the present invention wherein means are provided for indicating whether the error has occurred in the addressing circuitry or in the memory proper.
Figure 3:
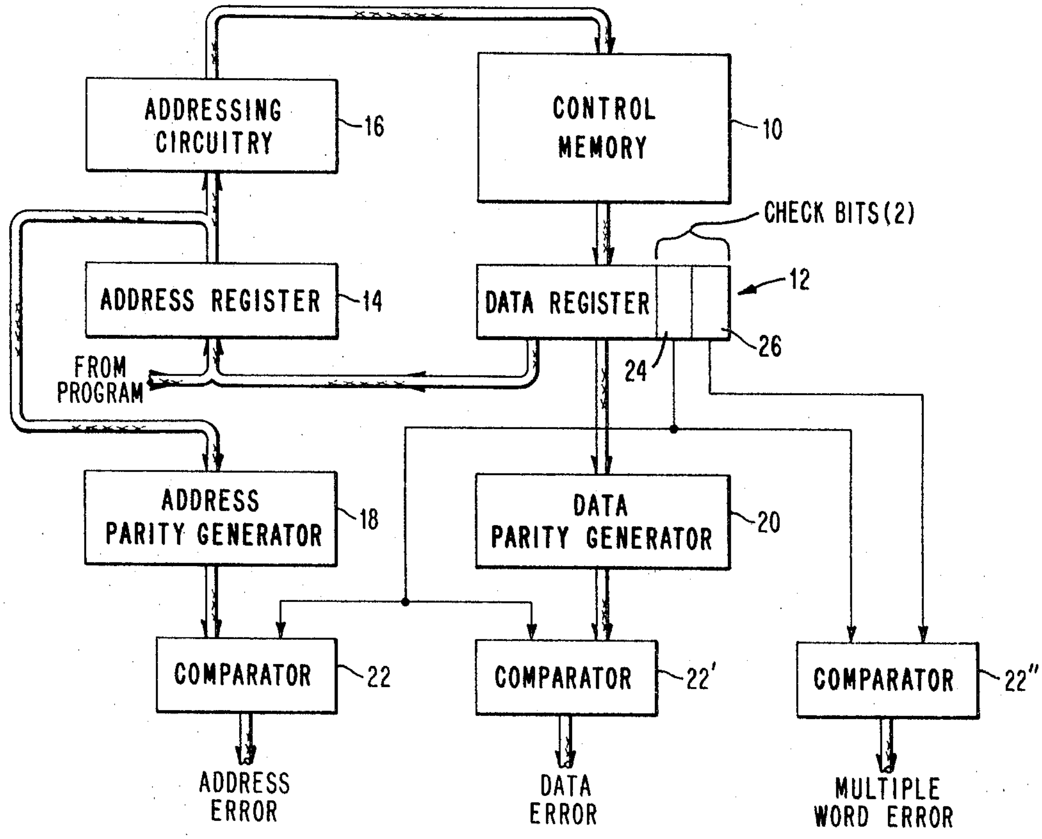
FIG. 3 is a functional block diagram of an error checking system according to the present invention including means for indicating, in addition to the above, whether or not a multiple word readout error has occurred.

Before proceeding with the specific description of the embodiments of FIGS. 1, 2, and 3 several comments are in order as to the nature of errors normally occurring in computer memory systems. It should first be realized however, that the present system is only capable of determining with high probability of accuracy single errors. When more than one error occurs, the probability of detection goes down considerably since obviously one error may be canceled in its affect on parity by a second error. However, in the majority of cases only single errors occur at any one time. In the addressing circuitry errors can occur in the address register itself so that, for example, one bit might be struck at either a one or a zero. In the addressing decoders and drivers the nature of the design is normally such that the vast majority of errors result in the selection of either no word, or more than one word to be read from the memory. An additional type of failure which might be encountered in the address driving circuitry is that an input to the decoder might be stuck at a one or a zero. Thus, the address decoded by the decoding circuitry would be one bit different from that appearing in the actual address register.

It should be clearly understood that the present system will not of itself detect a failure in the actual address register as this would have to be detected by normal parity checking means connected between the source for addresses provided for the address register and the actual address ultimately stored in the address register. However, these means are well known and these parity bits would not have to be carried in the actual data words in the microprogram store. Further, as indicated in the figures, the majority of addresses supplied to the address register come from the memory data register since once a control program sequence is entered, links to subsequent commands of the sequence are contained in the immediately preceding data word in the memory. Carrying the preceding description further, it will be noted that assuming a first address is stored in the address register and a single bit failure occurs in the input circuitry of the decoder, a data word will be read out of memory having a parity different from that of the address currently stored in the address register. This follows from the requirement that the parity of the data word and of the address associated with the data word and of the address associated with that data word have a fixed relationship whether equal or unequal. In the situation where no memory drive is actuated, there would be an all zero output to the data register. This situation would cause a parity check error in the present system in 50 percent of the cases; however, most standard memories have separate means for indicating a zero output at the end of a read cycle.

In the case of a double readout from the memory it will be apparent that too many of the bit positions in the data register will be set to one's unless of course the data words read out were identical. This situation will result in a 50 percent probability of a change in the parity in the word appearing in the data register. To assure a higher probability of detecting an error of this sort, the additional check bit described subsequently with respect to FIG. 3 is utilized.

Finally, assume a single bit location fault in the data register or in the memory itself, that is one of the storage locations is stuck at a one or a zero. If this "stuck at" condition causes a data error, this will be reflected obviously as a parity change and will now cause the parity of the data word to differ from that of the address stored in the address register.

Figure 4:
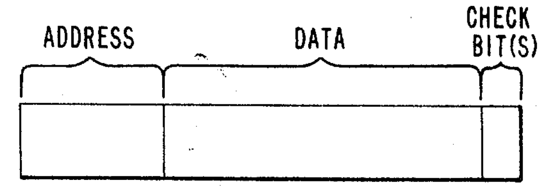
FIG. 4 illustrates the format of a typical data word which could be utilized in practicing the present invention.

Before proceeding with the description of the various embodiments of the invention of FIGS. 1—3, brief mention will be made of FIG. 4 which indicates a typical format of a control storage word. It will be noted from FIG. 4 that the control storage word is made up of an address and a data portion. The check bit (S) indicates that an additional one or two check bits may be utilized according to the embodiments of FIGS. 2 and 3. As is well known in the art, such microprogram sequences contain a data section which is actually the microprogram instruction and an address portion which is the linking address to the next command in said microprogram. The address segment may be a complete address or merely an address increment which is added to a base address or supplied to the control storage address register by the program. However, these techniques are well known in the art, it being apparent that by changing the address increment in the actual control storage word, the overall parity of the control storage word may be altered.

Referring now to FIG. 1, the most basic concept of the present invention is illustrated. The basic storage or memory hardware comprises the control memory 10, data register 12, address register 14 and the addressing circuitry 16. All of these units operate in a conventional fashion. That is an address is supplied to the address register 14, either from the program or as part of the data word extracted from the data register 12. The address is decoded and the conventional memory drive lines energized by the addressing circuitry 16 and as the appropriate X–Y drive lines are energized, the selected word will be read out of the control memory 10 and the data word will be stored in the data register 12.

At the end of each read cycle, the parity of the contents of the data register 12 is compared with the parity of the contents of the address register 14 by means of the two parity generators 18 and 20 and the comparator 22. It will be remembered that the parity of each data word stored in the memory 10 is designed to have a fixed relationship to the parity of the address of that particular word. For example, the parities may be designed to be equal. Assuming that everything is operating properly, the output of the two parity generators 18 and 20 will be the same and an equal input will be provided to the comparator 22. If the inputs are equal, there will be no output and thus no error signal generated. If the inputs to the comparator 22 are not the same, an error signal will be produced indicating a noncorrespondence between the parity of the two quantities currently in the address register 14 and the data register 12.

Assuming everything operates properly and there is no error signal, the instruction portion of the data word in the data register 12 will then be transferred to the conventional instruction execution portion of the computer and the address of the next instruction will be extracted from the data register, transferred to the address register and the next word accessed. If an error signal is produced, some diagnostic routine will normally be called into action by the system. However, this forms no part of the present invention and will not be discussed further. The diagnostic routine could either simply be a retry or it could shut down the entire system and require service personnel to determine what fault, if any, exists.

It will be noticed in the above embodiment that there is no circuitry for utilizing any check bits included with the data word. Thus, as will be apparent, this system will pick up any of the errors mentioned above which would cause a nonconformance between the parities of the quantities in the address register 14 and the data register 12 although the system is not capable of indicating which unit or section of the memory system is at fault.

The second embodiment of this system illustrated in FIG. 2 in which the same reference numerals illustrate essentially the same functional components of the system, a single check bit is provided in the data word which will indicate whether the error has occurred somewhere in the addressing circuitry or in the actual memory or data register portions. In this embodiment, again, the parity of the address and the parity of the data word are made equal and whether the particular parity is odd or even will be indicated by setting the single check bit to a one or zero. After a read cycle is completed, the outputs of the two parity generators 18 and 20 are compared separately against the check bit stored in the data register 12 by the two comparators 22 and 22′. Thus, if the output from comparator 22′ indicated no error in the data, but the output from the comparator 22 indicated an error, this would mean that the actual word readout from the memory 10 had the proper parity with respect to the check bit while the error indication from the comparator 22 indicates in effect that the data word whose address was called for by the address register 14 was in fact not accessed, the reason being that some error occurred in the addressing circuitry 16.

As stated previously in the specification, an additional failure which occurs with some regularity in such memories is a double word readout where in essence two different words are read concurrently from the memory into the data register. What this means is that all of the one's in one data word are superimposed over the other data word so that the word finally appearing in the data register 12 bears no resemblance to either of the data words originally read out. The embodiment shown in FIG. 3 is designed to pick up such double word readout errors.

The basis of operation of the embodiment of FIG. 3 is that when double readout errors occur, in the great majority of instances, they will be at address locations in memory which differ by only one bit. This frequently occurs when an address decoder fails and manifests the failure as an inability to recognize one bit of the address. Words are read out where that address bit is both zero and one. It can thus be seen that if the addresses of the two words read out differ by only one bit, their parities will also be different and thus the parities of the two data words will be different. This situation is taken advantage of in the embodiment of FIG. 3 by utilizing two check bits instead of one. Thus, referring to the figure, the check bit designated 24 will merely be a parity indication that will be set to a one or a zero depending upon the parity of the address and data word involved in the embodiment of FIG. 2. However, by providing a second check bit indicated by reference numeral 26, this bit may always be set to the binary complement of bit 24 and whenever a double word readout occurs, both locations 24 and 26 would be set to ones.

In the embodiments of FIG. 3, the comparators 22 and 22′ compare the outputs of the two parity generators 18 and 20 with the contents of the bit storage location 24 as in the embodiment of FIG. 2. However, an additional comparator 22″ compares the setting of the two check bits 24 and 26 and any time that these bits do compare a "multiple word error" will be indicated. It will be noted in passing that this comparator produces an output when the inputs are equal and produces no error output when the inputs are unequal. Whenever a "-multiple word error" output occurs, any error output of the other two comparators may be in effect overridden.

There has thus been described a novel memory error detection system and an overall method utilizing same whereby a number of memory errors may be detected utilizing a minimum of hardware and also storage space within the memory storing large numbers of parity bits and the like.

Although the system has been described as having probably the greatest utility in the area of control stores and memories utilizing read only storage techniques, the concepts would have equal utility for control memories of the read/write variety wherein data was not often rewritten. In addition, the concepts could be utilized in any conventional read/write memory; however, as indicated previously, considerable attention and time would have to be given to organizing data in the memory at the proper addresses.

While the invention has been particularly shown and described with reference to preferred embodiments thereof, it will be understood by those skilled in the art that various changes in form and details may be made therein without departing from the spirit and scope of the invention.

What we claim is:

1. A method for detecting errors in a conventional 3-dimensional memory system including a memory address register, decoding and addressing circuitry, which cause a single fixed word to be read from memory, a memory storage area per se, sensing circuitry and a data register connected to the output thereof, said method comprising the steps of storing all data words in said memory at an address therein such that the parity of said address bears a fixed predetermined relationship to the parity of said data word, checking the parities of a memory address and the resultant data word read out of the memory and stored in the data register subsequent to a readout operation, comparing the parities to determine if the fixed predetermined parity relationship exists and producing an error signal if said parity relationship does not exist.

2. A method as set forth in claim 1 wherein the address parity is determined by generating the parity of the actual address stored in the memory address register and determining the parity of the data word read out by generating the parity of the data word actually stored in the system data register.

3. A method as set forth in claim 2 wherein the parities of the address and data word are chosen to be equal and including the step of providing an extra check bit to be included with each data word in memory indicating the nature of the parity equality, and checking the contents of the check bit after each readout against the parities of said address and data word to ascertain whether an error that is present exists in the addressing circuitry or in the memory and data register circuitry.

4. A method as set forth in claim 3 including the additional step of providing a second check bit which is the complement of the first said check bit and the additional step of checking the two said check bits after each readout cycle to determine if they are equal and providing a system signal that a double word readout has occurred if both check bits are equal.

5. A memory system including an error detection mechanism; said memory system including an address register, decoding and addressing circuitry which cause a single fixed word to be read from the memory, a memory per se, sensing circuitry and a data register for said memory connected to the output of said sensing circuitry and in which memory data words are stored at predetermined addresses in said memory so that the parity of the data word bears a fixed predetermined relationship to the parity of the address of said word, means operable after a read cycle in the memory to determine the parity of the data currently stored in the data register, means concurrently operative with the previous means to determine the parity of the address currently in the address register, means to compare the two parties, and means operative to produce an "error" signal if the two parities do not have said fixed predetermined relationship to each other.

6. A memory system as set forth in claim 5 wherein the parties of the data words and addresses thereof are equal and wherein said last-named means includes means to produce an error signal whenever a parity inequality is detected.

7. A memory system as set forth in claim 6 wherein an additional check bit is included with each data word in memory, said check bit indicating whether the fixed predetermined relationship of parities is odd or even and means for comparing the two said parities with said check bit for correspondence.

8. A memory system as set forth in claim 7 wherein a second check bit is included in each data word and wherein the binary value stored in said second check bit is always the complement of the binary value stored in said first check bit and including means to compare the two check bits subsequent to a readout cycle and means to indicate a double word readout error whenever both of said check bits are a binary one.

9. A memory system as set forth in claim 6 wherein the two parity determining means are parity generators producing a predetermined binary value depending on whether or not odd or even parity is detected.

10. A memory system as set forth in claim 9 wherein said memory comprises a control memory for storing lists of computer instructions and wherein the data stored therein is essentially fixed.

11. A memory system as set forth in claim 10 wherein said memory is a read only store.